Feb. 15, 1927.

E. A. ERICKSON ET AL

MICROMETER

Filed Jan. 30, 1925

1,617,443

WITNESSES
J. Herbert Bradley

INVENTOR
Ernest A. Erickson
Pearl E. Neal
By Green & McCallister
Their Attorneys Patented Feb. 15, 1927.

1,617,443

UNITED STATES PATENT OFFICE.

ERNEST A. ERICKSON, OF WILSON, AND ZEARL E. NEAL, OF WEST ELIZABETH, PENNSYLVANIA.

MICROMETER.

Application filed January 30, 1925. Serial No. 5,739.

This invention relates to micrometers and more particularly to an attachment for use with standard inside micrometers.

Various devices have heretofore been employed for the purpose of providing a micrometer which was adapted to make both inside and outside measurements, but all such instruments have, so far as known to me, employed a U-shaped frame as part of the instrument regardless of whether inside or outside measurements were to be made. This results in an instrument having a relatively small range when used as an inside micrometer, because of the fact that the size of the U-shaped frame limited the minimum inside measurements which could be taken.

We have been able to overcome this disadvantage by adapting an ordinary inside micrometer to outside measurements and an object of our invention is to provide an attachment for use with an ordinary inside micrometer by means of which the latter can be used to make outside measurements.

In the use of such a device it will frequently be necessary to use extension rods in making measurements and a further object of this invention is to provide a device of the type set forth having a steady rest which may be used for supporting such an extension rod at the desired point.

A still further object is to provide an attachment for the purpose set forth which will be simple and cheap to manufacture, rugged in construction and simple and accurate in operation.

Figure 1:
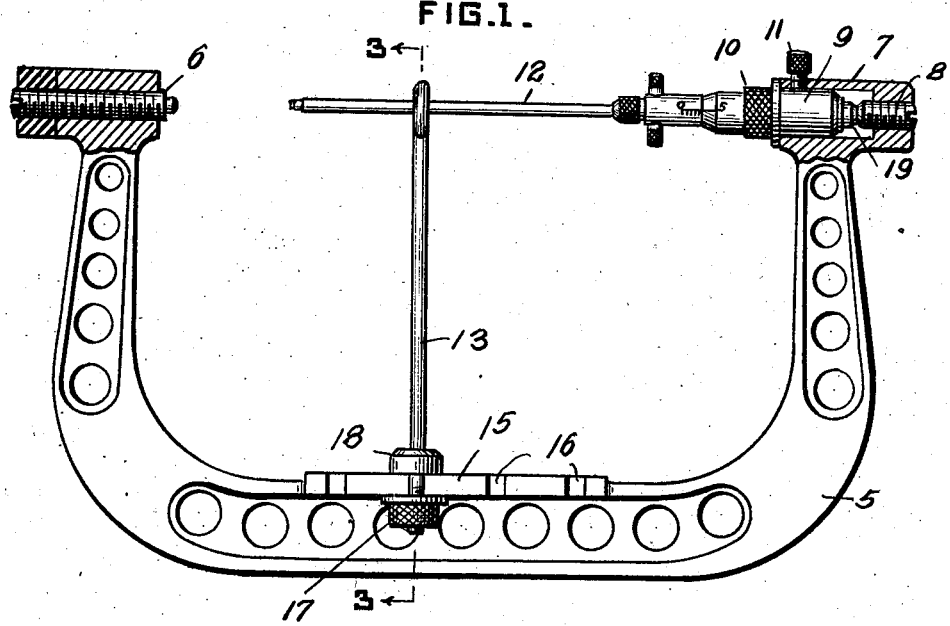
Figure 2:
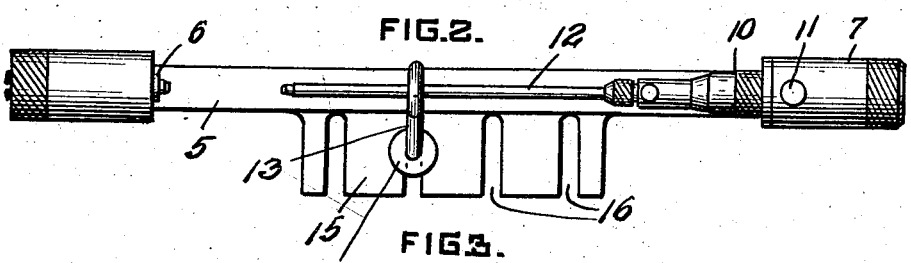
Figure 3:
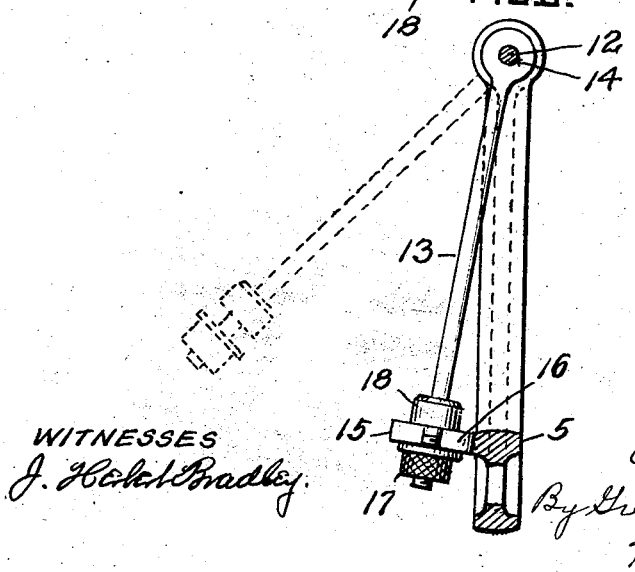

In the accompanying drawings, Figure 1 is a view in side elevation of an instrument embodying one form of this invention; Fig. 2 is a top plan view thereof; and, Fig. 3 is a vertical sectional view on the line 3—3 of Fig. 1.

The illustrated embodiment of this invention consists of a U-shaped frame 5 provided with the usual form of anvil member 6 at the extremity of one of the arms thereof. The other arm of the frame is provided with a cylindrical bore 7 which is in axial alignment with the anvil member 6. A stop screw 8 is threaded into the arm so as to extend into the bore 7 any desired distance and the inner face of this screw forms a mastering or positioning point for an inside micrometer in making measurements.

The bore 7 is adapted to receive the barrel 9 of any usual form of inside micrometer 10, such as is ordinarily sold on the market, and the latter is securely held in place by means of a set screw 11 extending into the bore through one wall thereof.

Obviously such a device provides an extremely simple means of obtaining outside measurements by means of an ordinary inside micrometer.

In use it may be found necessary to use extension rods 12 such as are well known in this particular art. In order to provide sufficient rigidity to insure accurate measurements we preferably support the extension rod by means of a steady rest 13 having an eye 14 through which the rod extends. In order to secure the steady rest in adjusted position a flange 15 extends laterally away from the base of the U-shaped frame and is provided with inwardly extending notches 16 in which the steady rest is securely fastened by means of a nut 17 threaded to the bottom thereof for the purpose of clamping the flange 15 against a collar 18 formed on the steady rest.

By providing a plurality of slots the rest is adapted to be positioned at that point along the extension rod at which it will provide the most rigid support, and the flange 15 must, of course, be at such an angle as to be at right angles to a line drawn on the axis of the extension rod. The steady rest can be moved along the rod merely by swinging it out of one of the notches 16 as shown in dotted lines in Fig. 3.

Assuming that outside measurements are to be taken, a standard inside micrometer is secured in the bore 7 by clamping the set screw 11 on the barrel of the micrometer in such a position that the stationary anvil 19 of the micrometer engages the inner face of the set screw 8, the latter having been positioned so as to form a mastering point for properly positioning the inside micrometer with relation to the anvil 6. In making settings the inside micrometer head is operated to obtain the adjustments. On account of the barrel being fastened and mastered to the frame, the micrometer screw is operated in the reversed manner from the usual practice.

If the distance between the master point and the anvil 6 is fourteen inches, to make a reading of six and one-quarter inches, the latter sum is subtracted from fourteen inches, and the remainder, seven and three-quarters inches, is the setting of the inside micrometer. In other words if the distance between the mastering point and the anvil 6 is fourteen inches, a micrometer setting of seven and three-quarters inches will give an outside reading between the extension rod 12 and the anvil 6 of six and one-quarter inches.

We claim:

1. The combination with a standard inside micrometer of a U-shaped frame having an anvil mounted in one arm thereof and a bore in the opposite arm in axial alignment with said anvil, means forming a mastering point associated with said bore and means for securing an inside micrometer in said bore with one of its anvils in engagement with said mastering point whereby the other anvil of said micrometer is adapted to cooperate with the anvil in said frame to make outside measurements.

2. The combination with a standard inside micrometer of a U-shaped frame having an anvil mounted in one arm thereof and a bore in the opposite arm in axial alignment with said anvil, a threaded rod associated with said bore so as to form a mastering point and means for securing said inside micrometer in said bore with one of its anvils in engagement with said mastering point whereby the other anvil of said micrometer is adapted to cooperate with the anvil in said frame to make outside measurements.

3. The combination with an inside micrometer of a U-shaped frame having an anvil mounted therein and a bore in axial alignment with and spaced from said anvil, means for mounting said inside micrometer in predetermined position in said bore for cooperating with said anvil to make outside measurements, an extension rod associated with said micrometer, a flange having a plurality of slots on said frame beneath said rod, a steady rest and means for securing said steady rest in any of the slots of said flange for supporting said rod at any desired point.

In testimony whereof, we have hereunto set our names this 27th day of January, 1925.

ERNEST A. ERICKSON.
ZEARL E. NEAL.